United States Patent Office 3,148,746
Patented Sept. 15, 1964

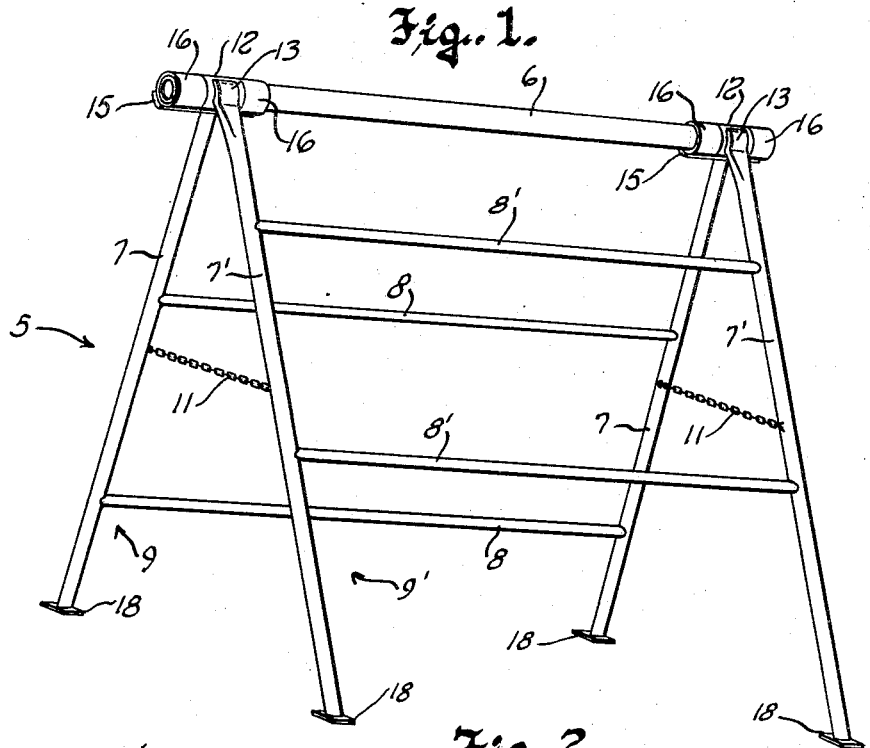
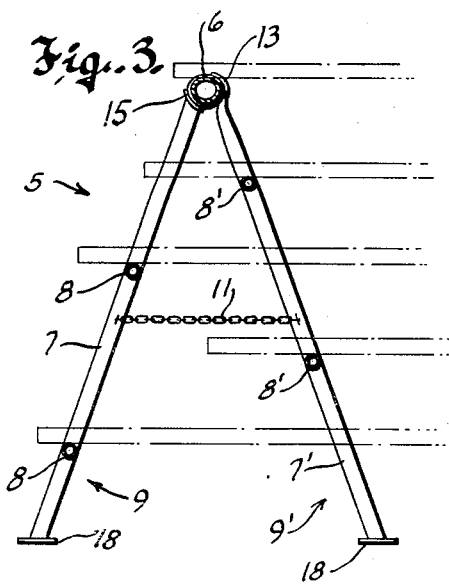
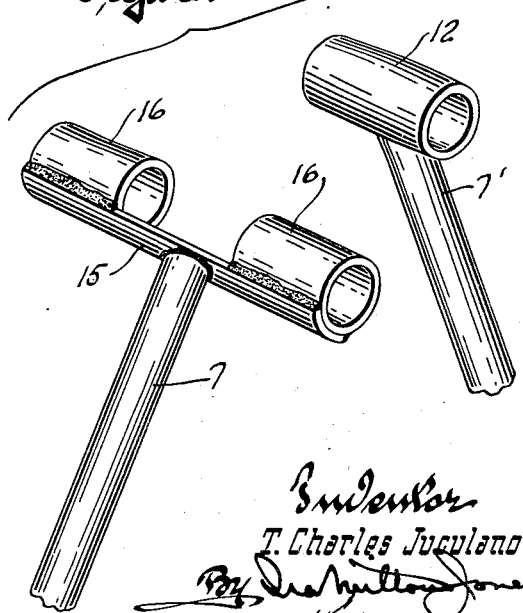

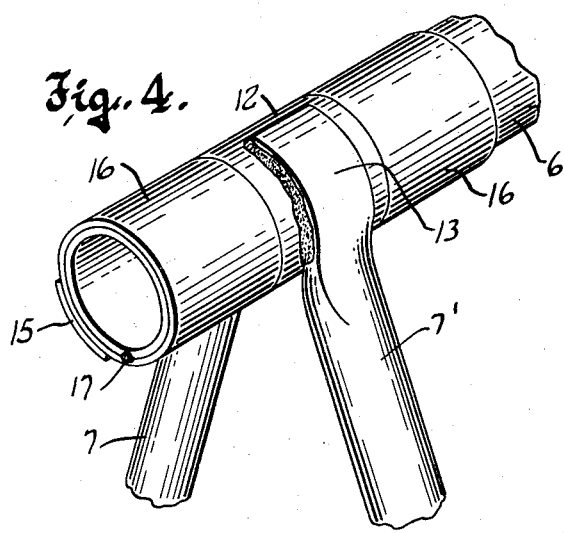
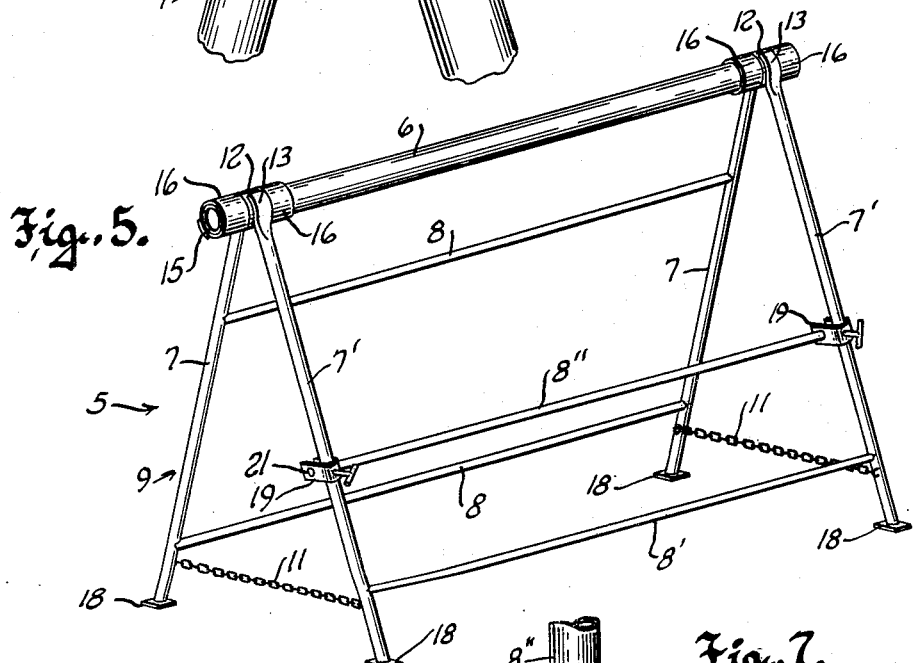
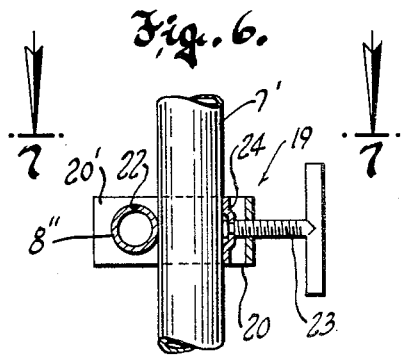
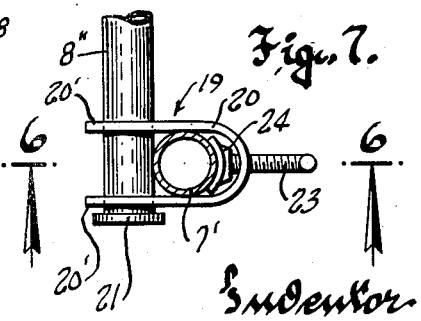

3,148,746
FOLDABLE HORSE
Theodore Charles Joculano, Oshkosh, Wis., assignor to Marvel Equipment Corporation, Oshkosh, Wis., a corporation of Wisconsin
Filed Feb. 6, 1963, Ser. No. 256,714
2 Claims. (Cl. 182—153)

This invention relates to horses of the type used for supporting planks and the like to provide an elevated platform, and the invention refers more particularly to a horse of that type which is collapsible or foldable for storage or transportation.

The general object of this invention is to provide a horse for supporting planks and the like which is inexpensive and easily manufactured, light in weight, versatile, easily stored and transported, but nevertheless rugged, durable and sturdy.

It is also an object of this invention to provide a horse of the character described which is capable of supporting planks and the like at any of a number of different elevations.

Another object of this invention is to provide a horse of the type comprising a stringer and laterally opposite downwardly divergent legs at each end of the stringer, wherein the legs at each side of the horse are swingable relatively toward and from the legs at the other side of the horse to allow the horse to be folded or collapsed for compact storage, and wherein the legs at each end of the horse are directly opposite one another.

Still another object of this invention is to provide a foldable or collapsible horse of the character described which can be manufactured of steel tubing at very low cost.

With the above and other objects in view which will appear as the description proceeds, this invention resides in the novel construction, combination and arrangement of parts substantially as hereinafter described and more particularly defined by the appended claims, it being understood that such changes in the precise embodiments of the herein disclosed invention may be made as come within the scope of the claims.

The accompanying drawings illustrate several complete examples of the physical embodiments of the invention constructed according to the best modes so far devised for the practical application of the principles thereof, and in which:

FIGURE 1 is a perspective view of a horse embodying the principles of this invention, shown in its unfolded or operative position;

FIGURE 2 is a fragmentary perspective view of the upper end portions of the two leg members at one end of the horse, illustrating the structure that provides for a relatively swingable connection between them;

FIGURE 3 is a sectional view of the horse shown in FIGURE 1, taken on a vertical plane intermediate the ends thereof;

FIGURE 4 is a fragmentary end perspective view on an enlarged scale of the horse shown in FIGURE 1;

FIGURE 5 is a perspective view of a modified embodiment of the horse of this invention;

FIGURE 6 is a detail sectional view taken on the plane of the line 6—6 in FIGURE 7, illustrating the clamping connection for the adjustable brace of the horse shown in FIGURE 5; and FIGURE 7 is a sectional view taken on the plane of the line 7—7 in FIGURE 6.

Referring now more particularly to the accompanying drawings, the numeral 5 designates generally a horse embodying the principles of this invention and which is of the type that comprises, in general, an elongated horizontal member or stringer 6, and legs 7 and 7' connected to the stringer near each end thereof and which normally extend downwardly and in opposite sideward directions from the stringer. The two legs 7 at one side of the horse are connected and held in coplanar relationship by a pair of elongated braces 8 which extend parallel to the stringer and which are laterally spaced from the stringer and from one another, said legs and braces together comprising a rigid leg assembly 9. The legs 7' at the other side of the horse are similarly connected by braces 8' which cooperate with said legs to provide another rigid leg assembly 9'.

As explained in detail hereinafter, the legs 7 and 7' are so connected to the stringer at their upper ends as to provide for relative swinging motion of the leg assemblies at the two sides of the horse between the normal operative condition of the horse illustrated in FIGURE 1, in which the legs 7 and 7' at each end of the stringer are in downwardly divergent relationship, and a folded or collapsed condition of the horse, in which said legs are in close side-by-side relationship. To limit divergent swinging of the leg assemblies, a chain 11 or the like is connected between the legs 7 and 7' at each end of the horse.

The stringer 6, the legs, and the braces can all be formed of tubular stock, such as inexpensive steel tubing, and the braces can be secured to the legs by welding.

Each of the legs 7' at one side of the horse is swingably connected to the stringer by means of a short length of tubing 12 which has an inside diameter substantially equal to the outside diameter of the stringer, and which provides a collar or sleeve that can be slipped over an end portion of the stringer. The sleeve 12 is preferably welded to the leg, and of course has its axis transverse to that of the leg. The upper end portion of each leg 7' is flattened as at 13, to insure a good weld joint between the sleeve and the leg and to offset the leg axis outwardly from the sleeve axis. Preferably the leg is connected to the sleeve midway between the ends of the latter.

To the upper end of each of the legs 7 at the other side of the horse there is secured, as by welding, a transverse member 15 having a length substantially greater than that of the sleeve 12, and to this transverse member, in turn, there are secured a pair of sleeve elements 16. The transverse member 15 holds the sleeve elements 16 in coaxial alignment and spaced apart by a distance equal to the length of the sleeve 12. The respective connections between the leg 7, the transverse member 15 and the sleeve elements 16 are preferably so located that the axis of leg 7 lies midway between the opposing inner ends of said sleeve elements and is offset slightly to one side of their axis.

When the several sleeve elements 12 and 16 of each pair of adjacent legs 7 and 7' are assembled onto an end portion of the stringer 6, with the sleeve 12 between the sleeve elements 16 as best seen in FIGURE 1, the two legs 7 and 7' are exactly opposite one another and are hingedly connected with the stringer for relative swinging motion.

One of the sleeve elements 16 is anchored to the stringer 6, as by means of a spot weld 17 at one end of the stringer (see FIGURE 4), to prevent axial displacement of the stringer and sleeve elements relative to one another. Only one such spot weld is necessary because the sleeve elements at the other end of the stringer are held in axially fixed relation thereto by the brace members 8 and 8'.

Preferably a small, flat piece of metal is welded to the lower end of each of the legs 7 and 7' to provide a foot 18.

Attention is directed to the arrangement of the braces 8 and 8'. The two braces 8 at one side of the horse are spaced apart by about the same distance as the braces 8' at the other side of the horse, but all of the braces are spaced different distances from the stringer 6, so that when the horse is in use the several braces are all at different elevations. Thus, as illustrated by FIGURE 3, a plank (indicated in broken lines) can be supported on any one of the braces or on the stringer, and hence if there are two braces on each side of the horse, as shown, the plank can be supported at any of five different elevations. By suitable spacing of the braces 8 and 8', the several intervals of distance between them can be made substantially equal, to provide the most versatile arrangement of supporting elevations.

FIGURE 5 illustrates a horse embodying the principles of this invention which can be adjusted to support planks or the like at any of a virtually unlimited number of elevations up to the height of the stringer 6. In most respects the horse shown in FIGURE 5 is similar to that described above, but the leg assembly at one side of the horse (in this instance shown as the leg assembly 9') has only one brace 8' permanently welded to the two legs 7' thereof. The welded brace 8' is preferably at a lower level than either of the two braces 8 on the other leg assembly 9. Another brace 8" on the leg assembly 9' is secured to the two legs 7' thereof by means of connectors 19 which provide for adjustment of the brace 8" upwardly and downwardly along the legs 7', so that the brace 8" can be positioned at any desired elevation between the fixed brace 8' and the stringer 6.

As best seen in FIGURES 6 and 7, each of the connectors 19 comprises a substantially U-shaped strap 20 that straddles one of the legs 7' with its bight portion at the outer side of the leg 7' and with its arms 20' projecting a substantial distance inwardly from the leg 7'. The end portions of the brace 8" are received in aligned holes 22 in the rearwardly projecting end portions of the arms 20' of the two straps 19, and are held against displacement out of the straps as by means of enlarged heads 21 or the like that are welded or otherwise fastened to the ends of the brace. Preferably the holes 22 are large enough so that the brace 8" fits somewhat loosely in them, and the brace has a length great enough to provide for some spacing between the heads 21 thereon and the straps, thus allowing the brace to be tilted substantially out of parallelism with the other braces and the stringer, to facilitate height adjustments of the brace 8" and permit compensation for any inclination from the horizontal of a surface upon which the horse may be resting.

To hold each strap or connector 18 in any desired position along the leg 7' that it straddles, a clamping screw 23 is threaded through the bight portion of the connector. If desired, each clamping screw can rotatably carry at its inner end a U-shaped clamping jaw 24 having a cross sectional shape which substantially conforms to that of the leg 7'.

From the foregoing description taken together with the accompanying drawings it will be apparent that this invention provides an unusually light and inexpensive but sturdy horse, capable of supporting planks or the like at any of a number of different elevations and adapted to be compactly folded or collapsed for storage and transportation. It will also be apparent that the horse of this invention can be quickly and easily fabricated from inexpensive steel tubing having welded connections, but is nevertheless very pleasing in appearance.

What is claimed as my invention is:

1. A collapsible horse for supporting planks and the like, of the type comprising a stringer and laterally opposite downwardly divergent legs connected with each end portion of the stringer, said horse being characterized by:

(A) coaxial end portions on the stringer;
(B) means connecting each of the legs at one side of horse with the stringer, comprising
   (1) a transverse member secured medially of its ends to the upper end of the leg, and
   (2) a pair of sleeves secured to the end portions of the transverse member in coaxial axially spaced apart relationship substantially equidistant from the leg and embracing an end portion of the stringer;
(C) means connecting each of the legs at the other side of the horse with the stringer comprising
   a sleeve secured medially of its ends to the upper end of the leg and embracing an end portion of the stringer between the two sleeves on the adjacent leg,
so that the two legs at each end of the stringer are opposite one another and lie in a common plane transverse to the stringer;
(D) the axes of all of the legs being outwardly offset with respect to the axis of the stringer so that the legs at one side of the horse may be brought into close juxtaposition to the legs at the other side of the horse, with all of the legs substantially parallel to one another whereby to minimize the storage space required by the horse when collapsed;
(E) elongated braces extending parallel to the stringer, each of said braces having its opposite ends connected with the legs at one side of the horse to brace the same and hold them in coplanar relationship, the several braces being spaced different distances from the stringer to cooperate therewith in providing for the support of planks and the like at any of a number of different heights;
(F) the sleeves that are fixed with respect to the legs at one side of the horse being freely rotatable on the stringer portions they embrace; and
(G) means anchoring one of the sleeves to the stringer, whereby all of the sleeves are held against axial displacement relative to the stringer.

2. The horse set forth in claim 1, further characterized by the fact that:

(A) two of said elongated braces are fixedly connected to the legs at one side of the horse;
(B) a third brace is fixedly connected to the legs at the other side of the horse and is spaced a greater distance from the stringer than either of said two first mentioned braces; and
(C) means on the ends of a fourth brace adjustably connecting the same to the legs at said other side of the horse between the third brace and the stringer in a manner enabling said fourth brace to be moved up and down and secured to its legs at any elevation between the stringer and said third brace.

References Cited in the file of this patent
UNITED STATES PATENTS

| | | |
|---|---|---|
| 418,938 | Bogusch | Jan. 7, 1890 |
| 739,886 | Loge et al. | Sept. 29, 1903 |
| 812,344 | Howser | Feb. 13, 1906 |
| 1,672,502 | Roth | June 5, 1928 |
| 1,856,349 | Bigelow | May 3, 1932 |
| 2,273,455 | Whitman | Feb. 17, 1942 |

FOREIGN PATENTS

| | | |
|---|---|---|
| 841,348 | Germany | June 16, 1952 |
| 1,112,565 | France | Nov. 16, 1955 |